J. W. Crary,
Brick Machine.
N° 21,186. Patented Aug. 17, 1858.
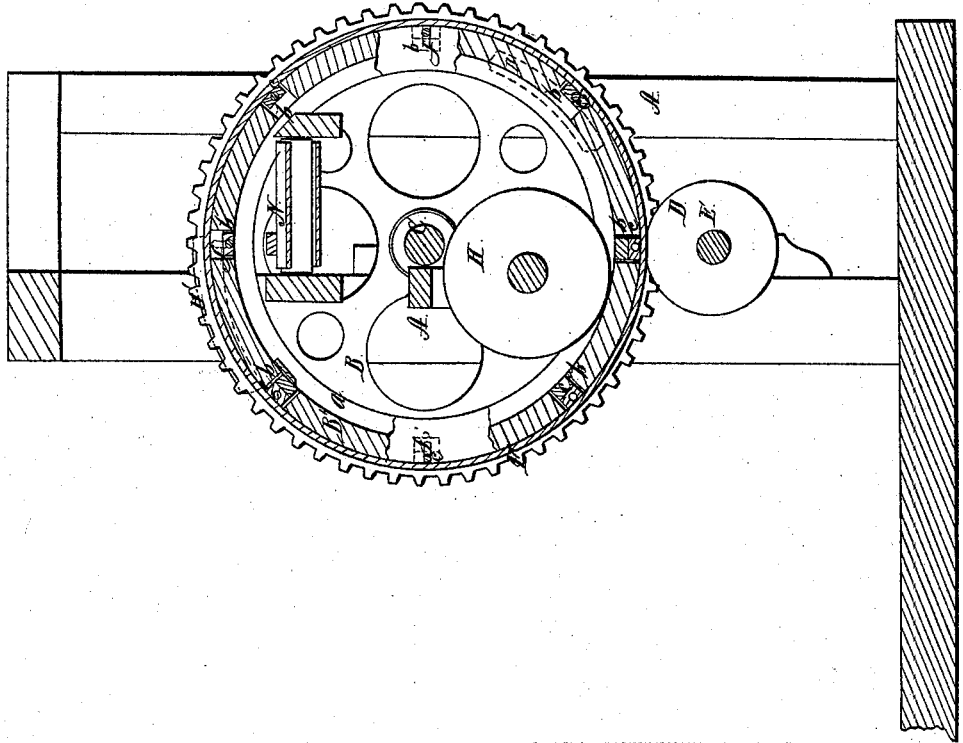
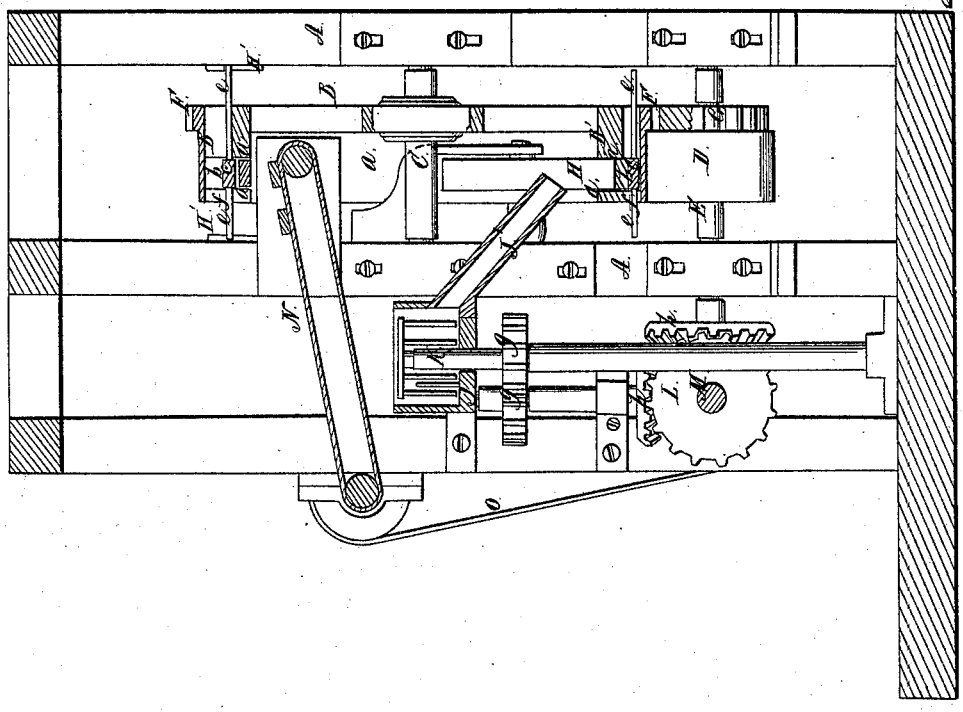

UNITED STATES PATENT OFFICE.

J. W. CRARY, OF NEW ORLEANS, LOUISIANA.

BRICK-MACHINE.

Specification of Letters Patent No. 21,186, dated August 17, 1858.

*To all whom it may concern:*

Be it known that I, J. W. CRARY, of the city of New Orleans, parish of Orleans, and State of Louisiana, have invented a new and useful Improvement in Brick-Presses; and I do hereby declare that the following is a full, clear, and exact description of the same, reference being had to the accompanying drawings, forming a part of this specification, in which—

Figure 1, is a vertical longitudinal section of a brick press constructed after my invention. Fig. 2, is a vertical transverse section of the same.

Similar letters of reference, in each of the several figures indicate corresponding parts.

The nature of my invention consists, 1st, in the combination of an annular rim or concave molding surface with a roller or convex pressing surface so that the bricks are molded by pressure operating toward the circumference and discharged in a direction toward the axis of said concave molding surface; 2nd, arranging a pug mill for the preparation of the dry clay to work in connection with said first feature of my invention by means of the gearing to be hereinafter described.

By this invention, the bricks are molded on the inner instead of the outer circumference of the molding surface. Thus molding bricks, it is believed is much better than the present modes as it gives a concave instead of a convex form to them on one of their faces for the reception of cement or mortar owing to the circle in which they are molded being smaller than it is when they are molded on the outer periphery of a wheel as commonly. It also avoids the necessity of having the pressing roller as large as usual owing to one concave and the other convex surface, instead of two convex surfaces being brought together.

To enable others, skilled in the art, to make and use my invention, I will proceed to describe its construction and operation.

A, represents the frame of the machine adapted for having my invention applied to it.

B, is the molding wheel arranged within the frame A, on a revolving axis or shaft C. The molding part of this wheel may consist of an annular rim B', grooved internally as at *a*, and furnished with a series of molds *b*, *b*, *b*, which open toward a common center C, but have their sides straight and parallel or at right angles with the inner face of plungers *c*, *c*, *c*, which form the bottoms of the molds. The outer periphery of the rim B', is supported at the point where the pressing is performed by means of a friction roller D, which is arranged on a shaft E, as shown. On the outer face of the pressing rim, a toothed disk or cog wheel F, of larger diameter than it, is fastened permanently. This cog wheel is supported by the shaft C, and serves as the main support of the molding rim.

G, is a small pinion on the shaft E, it gears into the large cog wheel of the molding rim and serves for transmitting motion from certain driving mechanism to said wheel and rim.

H, is the pressing roller, it is arranged between the center or shaft C, and the inner circumference of the molding rim, and serves for pressing the clay compactly into the molds as the rim revolves, as will be evident from the drawings.

I, H', are inclined planes arranged on the frame A, as shown and serving for the rods or arms *e*, *e*, of the plungers *c*, *c*, *c*, to come in contact with in the revolution of the molding rim and thus be alternately moved in and out. The inclined planes I, I, serving for forcing the plungers toward the bottom of the molds or outer circumference of the molding rim so as to admit of the molds being charged with clay and H', H', serving for forcing the molds toward the inner circumference of the molding rim so as to effect the discharge of the molded bricks from the mold. The inward and outward movement of the plungers is provided for by means of radial slots *f*, *f*, formed in the sides of the molds, as shown. The clay is supplied to the molding rim from a pug mill J, by means of an inclined spout J'. The pug mill is arranged on the open side of the molding rim and its vertical stirring shaft K, is driven by means of spur and bevel wheels *g*, *g*, *h*, *h*, which are combined with the main driving shaft M, by means of a bevel wheel, as shown.

N, is an endless belt or apron for receiving the bricks from the mold and conveying them away as fast as molded and discharged from the rim. This belt is driven from the main shaft M, by a band O, as shown in Fig. 1.

Instead of having the molding surface form a complete circle and rotate, it might be made to form only a part of a circle and arranged so as to oscillate. In this case the convex presssing surface or roller would revolve in opposite directions as the molding concave performs its back and forward circular movements.

Instead of providing the molding wheel with arms and with a central axis, it might be found advantageous in practice to simply construct it in the form of an annular rim and suspend it between the pressing roller and a series of friction rollers which are arranged to bear against its outer circumference.

From the foregoing description and accompanying drawings, it will be evident that the molding of the bricks is accomplished on the inner circumference and below the center or shaft C, of the molding rim, and the discharge of the same takes place on the inner circumference of said rim and above the shaft or center on which it revolves.

What I claim as my invention and desire to secure by Letters Patent, is—

1. The combination of an annular rim or concave molding surface, with a roller or convex presssing surface, so that the bricks are molded by pressure operating toward the circumference and discharged in a direction toward the axis of said concave molding surface, substantially as and for the purposes set forth.

2. Arranging a pug mill for the preparation of the dry clay, to work in connection with said first feature of my invention by means of the gearing herein described, substantially as and for the purposes set forth.

J. W. CRARY.

Witnesses:
 THOMAS E. JORDAN,
 RICHD. H. BONIFOY.